July 30, 1968  W. R. JENSEN  3,394,950

HOSE COUPLING ATTACHMENT

Filed Aug. 9, 1967

INVENTOR.
WARREN R. JENSEN
BY
Schroeder, Siegfried
& Ryan
ATTORNEYS

United States Patent Office 3,394,950
Patented July 30, 1968

3,394,950
HOSE COUPLING ATTACHMENT
Warren R. Jensen, 117 3rd St. NW., P.O. Box 1088,
Valley City, N. Dak. 58072
Filed Aug. 9, 1967, Ser. No. 659,411
5 Claims. (Cl. 285—35)

ABSTRACT OF THE DISCLOSURE

This invention relates to an improved hose coupling attachment in which a tubular body part provides for connection to a flexible hose and is preferably made of a metallic material with segmental flanges at the extremity of the same remote from the hose capable of flexing relative to the main portion of the tubular body part. These segmental flanges have threaded inner surfaces that are adapted to be deflected toward a co-operating coupling member having an outer threaded peripheral surface. A cylindrical sleeve part is positioned over the tubular body part and translational movement of the sleeve part will cause projections on the flanges and riding in grooves in the sleeve part in a cam track therein to deflect the flanges toward the coupling member to effect the coupling therebetween.

---

This invention relates to pipe or hose couplings and more particularly to an improved hose coupling attachment to adapt hoses for a rapid coupling and uncoupling to co-operating coupling parts.

Structure of this type is known and in use. The present invention is directed to an improved hose coupling attachment which is simple in design, may be readily manufactured and provides a positive seal between coupling parts. Further, it provides a permanent-type attachment where required and is rugged in construction to enable the same to withstand exposure and abusive environments. The improved coupling attachment comprises a pair of body parts, which may be readily formed from a stamping or turning operation, one of which is adapted to be connected to a hose and the other of which is mounted on the same and includes segmental flanges which may be deflected by a sleeve member positioned over the same to provide a gripping surface therein. This surface will combine with a co-operating male coupling part and with a slight turning movement will provide a positive seal between the parts. The improved hose coupling attachment may be readily used in the coupling of hoses to faucets or other hoses for normal household usage as well as commercial application.

Therefore, it is the principal object of this invention to provide an improved hose coupling attachment.

Another object of this invention is to provide in a hose coupling attachment, a structure which is simple in design, low in cost and easy to use.

A still further object of this invention is to provide an improved hose coupling attachment which insures a positive seal between parts.

Figure 1:
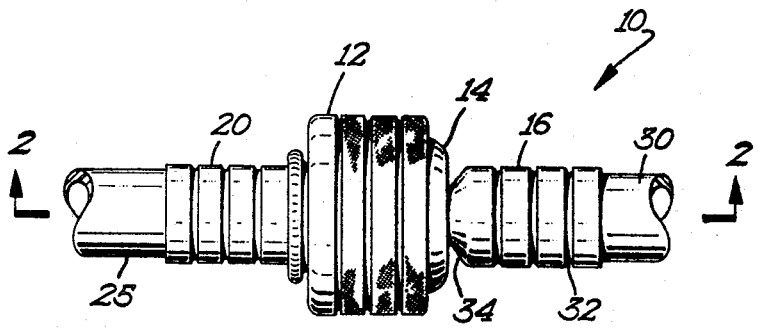
Figure 2:
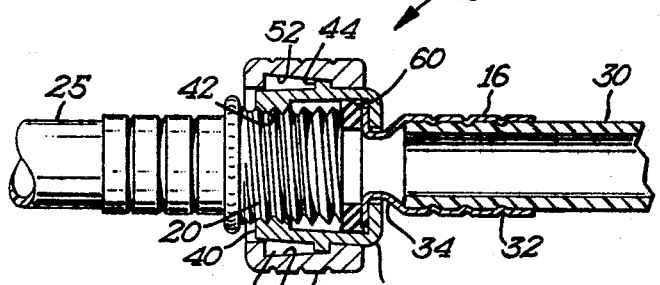
Figure 5:
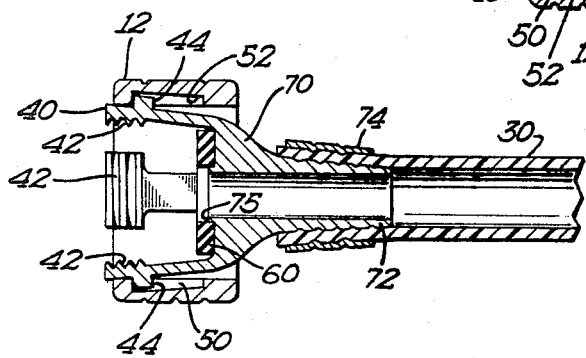
Figure 3:
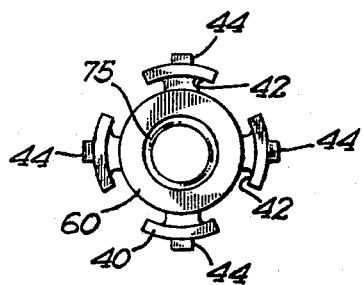
Figure 4:
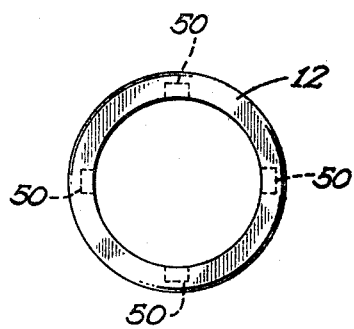

These and other objects of this invention will become apparent from a reading of the attached description together with the drawings wherein:

FIGURE 1 is an elevation view of the improved hose coupling attachment showing one of its applications, FIGURE 2 is a sectional view of the hose coupling attachment of FIGURE 1 taken along the lines 2—2 therein, FIGURE 3 is an end elevation view of a portion of the improved hose coupling attachment part of FIGURE 2, FIGURE 4 is an end elevation view of the second portion of the improved hose coupling attachment of FIGURE 2, and FIGURE 5 is a sectional view of another embodiment of the hose coupling attachment showing the relationship of parts.

As shown in the drawings, the improved hose coupling attachment is indicated generally at 10 as comprising an outer cylindrical sleeve member 12 with a multipart coupling body indicated at 14 and 16 respectively. This hose coupling attachment is adapted to be connected to a coupling member, indicated at 20, having an externally threaded peripheral surface 22 which may take the form of a male fitting attached to a hose indicated generally at 25 or be the threaded extremity of a valve or faucet outlet in a conventional manner.

The body parts 14 and 16 of the hose coupling attachment are generally cylindrical or tubular in form and it will be seen that the coupling part 16 has a generally tubular extent with one extremity being adapted to be connected to a hose indicated at 30 in a telescopic manner through a suitable pressure-type coupling such as is indicated by the circular grooves 32. The opposite extremity of the tubular body part has a reduced tubular section 34 which may be formed by a pressing or turning operation. The body part 14, as shown in section in FIGURE 2 is generally cylindrical at one extremity and is curved or inwardly directed so as to fit into the grooved portion 34 of the reduced extremity of body part 16 to be mounted therein and rotatable thereon. The opposite extremity of the body part 14 includes a plurality of segmental flanges 40 which have an inner surface which is threaded, as at 42, and a raised or radially outward projection 44 on the opposite or outer surface of the flange. In addition, the extremities of the segmental flanges are generally curved to define a circular or cylindrical configuration and these parts are flexible along their extent so as to be deformed and bent from the main or cylindrical portion of the body part 14 to be directed inwardly through the general extent of the passage through the tubular body part 16.

As will be seen in FIGURES 1 and 2, these inner threaded surfaces of the segmental flanges 40 are adapted to engage and mate with the threaded outer periphery of a coupling part 20 when deflected. In the undeflected position, sufficient clearance is provided between the parts so as to allow the coupling member 20 to be inserted into the hose coupling attachment preparatory to the coupling. The sleeve member 12 of the hose coupling attachment sits over and encircles the body part 14 and engages the projections and knobs 44 on the segmental flanges 40 thereof. The sleeve member, as will be seen in FIGURE 4, has a plurality of grooves 50 therein which are positioned on the inner peripheral surface thereof remote from the extremities of the same and are tapered as at 52. In the present embodiment of the hose coupling attachment, four segmental flanges 40 are shown and the sleeve member 12 includes four such grooves 50 therein. In the mounting of the sleeve member 12 on the coupling part 14, the segmental flanges 40 are deflected to permit the sleeve member to be moved to a position where the projections 44 will be positioned in the notches or grooves 50 and will be normally retained thereon. Translational movement, that is along the axis of the tubular body parts 14 and 16 of the hose coupling attachment, will cause the projections 44 to ride on the groove or cam surfaces 52 of the grooves 50 deflecting or urging the segmental flanges inwardly. Whenever a male or co-operating attachment or coupling member 20 is positioned within the confines of the sleeve member and segmental flanges it will be gripped by the threaded surfaces 42 of the segmental flanges to provide a cooperating or threaded relationship with the outer peripheral threaded surface of the coupling member. This will provide a positive connection between the hose coupling attachment and the coupling member 20, which as previously indicated, may be attached to the extremity of a hose or the threaded spout of a faucet or pipe. The overall length of the sleeve member substantially encompasses the length of the body part 14. Positioned at the extremity of the body part 16 adjacent the reduced tubular portion 34 thereof is a sealing washer 60. This may be positioned to engage the inner peripheral edges of the cylindrical or tapered solid portion of the body part 14 adjacent the segmental flange portions thereof or it may be mounted on a projection of the body part 16 concentric with the extent of the tubular passage therethrough. The washer 60 will normally be positioned between the extremity of the coupling member 20 and the body part 16 so that as the two are brought into alignment and abutting relation the washer will be squeezed therebetween and provide a positive liquid-tight seal. The sleeve member 14 when rotated will cause the body part 14 to rotate through the engagement of the projections 44 in the grooves 50 threading the coupling members 16 further into the confines of the hose coupling attachment to bear against the washer 60 and provide this liquid-tight seal. Normally, a fraction of a turn is all that is required to provide such a seal after the coupling member 20 has been engaged by the inner threaded surfaces 42 of the segmental flanges.

The alternate embodiment shown of the improved hose coupling attachment shown in FIGURE 5 is substantially identical with that of the preferred embodiment shown in FIGURES 1, 2, 3 and 4 except for the construction of the tubular body parts 14 and 16. In FIGURE 5, this portion of the hose coupling attachment, as shown at 70, is an integral unit with a generally cylindrical portion having segmental flanges 40 extending therefrom. The flanges 40 have threaded inner surfaces 42 thereon being formed at one extremity of the body part 70. The body part is made of a metal material or other suitable material which is flexible so that the flanges may bend from the main body portion thereof. The opposite extremity of the body part 70 is tapered, as at 72 to a tubular portion to provide the mounting of a hose 30 thereon through a suitable clamping ring 74. Sleeve member 12 with the camming notches 50 therein fit over the projections 44 on the flanges and the sleeve member is moved relative thereto to displace the segmental flanges in the same manner. The sealing washer 60 is positioned on a circular rib 75 of the tubular body designed to mount the same such that the washer is positioned within the confines of the tubular body part adjacent the segmental flanges and concentric with the passage through the tubular body part 70. In this embodiment, partial turning of the hose coupling attachment relative to a coupling member (not shown) requires that the entire hose coupling attachment together with a hose 30 be rotated a fraction of a turn to provide a liquid tight seal therebetween.

In the operation of the hose coupling attachment, rapid coupling and decoupling from a co-operating member, such as is indicated at 20, is provided. The sleeve member 12 when moved translationally toward the general extent of the hose coupling attachment or to the right, as shown in the drawings, will cause the projections 44 to ride into the deepest portion of the cam grooves 50 allowing the segmental flanges to flex outwardly and free any threaded coupling member, such as 20. Whenever it is desired to attach the hose on which the attachment is positioned to a coupling member, such as 20, the sleeve is maintained in such a position to provide for maximum opening of the segmental flanges and the threaded outer periphery of the coupling member to which the attachment is to be connected or coupled is brought into the confines of the hose coupling attachment to a maximum position. Thereafter, the sleeve member is moved translationally in a direction to cause the camming surfaces 52 in the grooves 50 to engage the projections 44 on the segmental flanges and flex the same inwardly engaging the outer threaded peripheral surface of the coupling member. When the sleeve member has moved to its maximum translational position to provide a positive threaded relationship between the hose coupling attachment and the coupling member to which it is attached, a partial turn in the proper direction to provide further threading of the coupling member into the confines of the hose coupling attachment will bring the extremity of coupling member into engagement with the washer 16 and provide the positive liquid-tight seal therebetween. In the preferred embodiment of the multi part body structure, relative movement between the body parts is provided to prevent twisting of the hose 30. In the alternate embodiment of FIGURE 5, the tubular body part is integral and slight twisting of the hose is required for a positive seal. The sleeve member 12 will cover the segmental flanges providing a protective surface around the same so that they may not be jarred or otherwise dislodged from the coupled relationship. Such a hose coupling attachment may be used on conventional household hoses to provide permanent or temporary connections between hoses and a faucet or pipe or other hoses having a male-type coupling extremity. This improved hose coupling attachment is simple in design and may be readily used to provide a positive esal for liquid pressure connections.

In considering this invention, it should be remembered that the present disclosure is intended to be illustrative only and the scope of the invention may be determined by the appended claims.

What is claimed is:

1. A hose coupling attachment comprising a tubular body part having a passage therethrough with a reduced tubular portion at one extremity thereof and a cylindrical portion having a plurality of segmental flanges secured to and extending outwardly and away from the reduced tubular portion, said tubular body part being adapted to telescope with a flexible hose and be secured thereto at said one extremity, said segmental flanges having generally axially extending peripheral extremities with a threaded internal surface and a radially outward projection on the outer surface of the flanges, and a cylindrical sleeve member positioned over the segmental flanges and slidably mounted thereon for translational movement, said sleeve member including a plurality of tapered grooves therein adapted to fit over the radial projections on the outer surface of the segmental flanges to cam the same toward the passage in the first tubular part upon translational movement of the sleeve member relative to the tubular body part, said segmental flanges when deflected being adapted to fit over and engage a coupling member having an outer threaded peripheral surface to provide a pressure-type coupling between the coupling attachment and the coupling member.

2. The hose coupling attachment of claim 1 in which the tubular body part includes a multi-member structure with a first member having the passage therethrough and the reduced tubular portion at one extremity thereof and a second member having the cylindrical portion with a plurality of segmental flanges thereon which are formed integral with the cylindrical portion, and in which the cylindrical portion of the second member for the multi-member structure of the tubular body part is journaled on said reduced tubular portion for rotational movement relative thereto.

3. The hose coupling attachment of claim 2 in which the segmental flanges are four in number.

4. The hose coupling attachment of claim 2 in which the grooves in the sleeve member terminate remote from the edges of the sleeve member and fit over the radial projections in the outer surface of the segmental flanges to provide a rotative drive connection between the sleeve member and the second member of the tubular body.

5. The hose coupling attachment of claim 2 in which the length of the cylindrical sleeve member substantially encompasses the second body part and the sleeve member is retained thereon through the projections on the segmental flanges positioned in the grooves in the sleeve member.

References Cited

UNITED STATES PATENTS

| | | | |
|---|---|---|---|
| 1,297,719 | 3/1919 | Myers | 285—322 X |
| 2,259,137 | 10/1941 | Eftiger | 285—35 |
| 2,388,179 | 10/1945 | Prowd | 285—35 |
| 2,469,111 | 5/1949 | Harding | 285—322 |
| 3,168,333 | 2/1965 | Dziura | 285—35 |

FOREIGN PATENTS

| | | |
|---|---|---|
| 8,503 | 7/1902 | Austria. |
| 28,505 | 12/1907 | Great Britain. |
| 295,555 | 8/1928 | Great Britain. |
| 1,310,713 | 10/1962 | France. |

CARL W. TOMLIN, *Primary Examiner.*

D. W. AROLA, *Assistant Examiner.*